United States Patent
Bauer

(10) Patent No.: US 6,244,410 B1
(45) Date of Patent: Jun. 12, 2001

(54) STARTING CONTROL TO CONTROL A HYDRAULIC PISTON /CYLINDER UNIT

(75) Inventor: Josef Bauer, Nandlstadt (DE)

(73) Assignee: Markus Liebherr, Eberhardzell (DE)

( * ) Notice: Subject to any disclaimer, the term of this patent is extended or adjusted under 35 U.S.C. 154(b) by 0 days.

(21) Appl. No.: 09/448,955

(22) Filed: Nov. 24, 1999

(30) Foreign Application Priority Data

Nov. 25, 1998 (DE) .............................................. 198 54 453

(51) Int. Cl.$^7$ .............................. F16D 48/08; F15B 11/10
(52) U.S. Cl. .................................... 192/85 R; 192/109 F; 91/447; 137/116.3
(58) Field of Search ................................... 192/3.57, 3.58, 192/85 R, 52.4, 109 F; 91/447; 137/116.3

(56) References Cited

U.S. PATENT DOCUMENTS

| | | | |
|---|---|---|---|
| 3,550,507 | * 12/1970 | Schott | 192/109 F X |
| 3,566,716 | * 3/1971 | Chatterjea | 192/109 F |
| 3,583,422 | * 6/1971 | Dach et al. | 137/116.3 |
| 3,991,865 | * 11/1976 | Komatsu | 192/109 F |
| 4,046,162 | * 9/1977 | Rodeghiero | 192/109 F X |
| 5,131,514 | * 7/1992 | Machida | 192/85 R |

* cited by examiner

*Primary Examiner*—Richard M. Lorence
(74) *Attorney, Agent, or Firm*—Dilworth & Barrese LLP.

(57) ABSTRACT

The present invention relates to control of a hydraulic piston/cylinder unit, in particular a multi-disc clutch having a control valve which can be moved into an open and a closed position, a first connecting line connected to the hydraulic piston/cylinder unit and a second connecting line connected to a pressure feed. The first and second connecting lines are in communication with the control valve. The first connecting line is designed such that when subjected to pressure, a force acting in the closed position can be generated on the control valve. The control further possesses a first control line which is in connection with the control valve such that when subjected to pressure, a force acting in the open position can be generated on the control valve. Furthermore, a restrictor element is provided whose inlet can be connected to the pressure feed and whose outlet is in communication with a pressure store and the first control line. The control valve is designed such that it is moved from the open position to the closed position when the pressure force acting in the first connecting line exceeds the pressure force acting in the first control line by a given amount.

20 Claims, 6 Drawing Sheets

STARTING CONTROL TO CONTROL A HYDRAULIC PISTON /CYLINDER UNIT

BACKGROUND OF THE INVENTION

The invention relates to a starting control to control a hydraulic piston/cylinder unit, in particular to control a multi-disc clutch. The present invention further relates to a multi-disc clutch having a disc package which can be compressed by a piston, having a feed for a hydraulic medium being disposed in such a way that a force directed to the disc package can be generated on the piston when pressure is applied to the feed, and having one or more restoring elements which apply a counter-force to the piston working against the force which can be applied by the hydraulic medium. The present invention further relates to a vehicle, in particular a commercial vehicle, having a piston/cylinder unit which can be subjected to a hydraulic medium.

A multi-disc clutch possesses several clutch discs disposed on a drive shaft which clutch disks are, when the clutch is actuated, connected non-positively to gears or disks provided between the discs and being in communication with a drive shaft and allowing in this way the transfer of a torque. When the clutch is actuated, a movably disposed piston is subjected to hydraulic oil and thus moved in the direction of the disc package. After overcoming the release path existing between piston and disc package, the piston abuts the disc package and compresses the disc package in dependence on the oil pressure being applied, whereby the output shaft and the input shaft are connected non-positively to each other. When the piston is relieved of the oil pressure, it is pressed back by the restoring springs of the clutch and the clutch is disengaged in this way.

To ensure the secure separation of the clutch, a certain release path has to be observed whose size depends not only on production tolerances of the discs, but also on the wear of the clutch. As the wear of the discs increases, the release path also becomes longer. With known prior multi-disc clutches, it is disadvantageous that the time slope of the clamping pressure of the piston on the disc package is dependent on the size of the release path to be covered. It follows from this that production tolerances or clutch wear increasing in operation impact on the shift characteristic of the clutch. This can, for example, lead to the clamping pressure increasing in a relatively short time with increased wear, which results in a correspondingly short actuation of the clutch.

SUMMARY OF THE INVENTION

It is the object of the present invention to provide an apparatus by means of which a soft actuation of the clutch can be effected.

This object is solved by a starting control of the generic type which comprises a control valve which can be moved into an open and a closed position, a first connecting line which can be connected to the hydraulic piston/cylinder unit and a second connecting line which can be connected to a pressure feed. The first and second connecting lines are in communication with the control valve. The first connecting line is designed in such a way that when pressure is applied to it, a force acting in the closing position can be generated on the control valve. Furthermore, a first control line is provided which is in communication with the control valve in such a way that when pressure is applied to it, a force acting in the open position can be generated on the control valve. The starting control in accordance with the invention further possesses a restrictor element whose inlet can be connected to the pressure feed and whose outlet is in communication with the pressure store and the first control line. The control valve is designed in accordance with the invention in such a way that it is moved from the open position into the closed position when the pressure force acting in the first connecting line exceeds the pressure force acting in the first control line by a given amount.

By means of the starting control in accordance with the invention, it is achieved that oil or any other suitable hydraulic medium first flows into the piston chamber of a multi-disc clutch until the control valve closes. The control valve is closed in accordance with the invention when the force acting in the closed position when pressure is applied to the first connecting line exceeds the force acting in the open position when pressure is applied to the first control line by a given amount. This given amount should advantageously be coordinated in such a way that the pressure existing in the piston chamber of the piston/cylinder unit or the multi-disc clutch is sufficient to guide the piston of the multi-disc clutch to the disc package against the force of the restoring springs.

If the pressure existing in the first connecting line increases, the control valve is closed when the difference which can be given is exceeded.

The hydraulic medium flowing in is now led into the pressure store via the restrictor element, with the pressure existing in the outlet of the restrictor element also applying in the first control line of the control valve. Increasing the pressure in the first control line leads to the control valve opening again, whereby finally pressure builds up in the piston chamber of the piston/cylinder unit or the multi-disc clutch at the same speed as in the pressure store of the starting control in accordance with the invention. In this way, it is achieved that irrespective of the length of the release path to be covered always the desired time slope of the clamping pressure of the piston on the disc package exists. The clamping pressure is increased in a given time from zero to the maximum value.

In accordance with a preferred aspect of the present invention, a second control line is provided which is in communication with the first connecting line and the control valve and which is designed in such a way that when pressure is applied to the second control line, a force acting in the closing position can be generated on the control valve. It thus becomes possible not to exert the force acting in the closed position on the control valve or not to exert it exclusively through the first connecting line, but through the second control line. The second control line can be designed as a branch from the first connecting line.

A spring can be provided by means of which the control valve is biased in the open position. The control valve is thus held in the open position until the difference in the pressure forces acting on the control valve exceeds the spring force. The spring and the hydraulic medium located in the first control line and being under pressure act in the same direction while the counter-force is applied by the hydraulic medium existing in the first connecting line or in the second control line and also being under pressure.

In accordance with a preferred aspect of the present invention an electrical measuring and control unit 1000 is provided by means of which the pressures in the first control line and in the first connecting line and/or in the second control line can be recorded and assessed and by means of which, in dependence on the assessment, a force acting in the open and closed positions of the control valve can be exerted. The actuation of the control valve is thus also possible with the help of measurement value detectors and a corresponding assessment of the measurement results, whereby a working of the control valve identical to the mechanical design can be realized.

It is particularly advantageous if a solenoid valve is provided by means of which the starting control can be locked from the pressure feed. The solenoid valve is opened when the clutch should be actuated, whereby correspondingly communication is manufactured between the pressure feed and the s starting control in accordance with the invention.

In another aspect of the present invention it is provided that the restrictor element and/or the control valve possess a by-pass line in which a check valve is provided by means of which the hydraulic medium can be led out of the pressure store and/or the piston/cylinder unit. When the clutch is disengaged, the hydraulic medium flows from the pressure store through the corresponding check valve in the by-pass line of the restrictor element and the hydraulic medium from the piston chamber or the multi-disc clutch through the check valve in the by-pass line of the control valve back to the storage tank.

It is particularly advantageous if the pressure store comprises a piston/cylinder unit whose piston chamber is in communication with the outlet of the restrictor element and whose piston is biased by a spring against the pressure force prevailing in the piston chamber. The hydraulic medium flowing through the restrictor element is led into the piston chamber of the piston/cylinder unit and displaces the piston against the spring force acting thereon. The speed of the pressure build-up in the piston/cylinder unit of the pressure store corresponds to the speed of the pressure build-up in the piston chamber of the piston/cylinder unit or the multi-disc clutch controlled by the starting control in accordance with the invention.

In another aspect of the present invention it is provided that the pressure store possesses an outlet line by means of which the hydraulic medium passing through the piston can be led off.

In accordance with a preferred embodiment of the present invention, the pressure drop which can be generated by the restrictor element is adjustable.

It is particularly advantageous if the control valve possesses a housing and a piston movably accepted therein which is biased in the open position of the control valve and which is in communication with the first control line and with the first connecting line and by means of which the control valve can be opened or closed in dependence on the piston position.

In accordance with a preferred aspect of the present invention, the housing possesses boreholes in communication with the second connecting line.

The piston is advantageously designed as a hollow cylinder in the end region in communication with the first connecting line, with the wall of the hollow cylinder possessing boreholes which in the open position of the control valve are in communication with the boreholes of the housing and which in the closed position of the control valve are separated therefrom in a fluid-tight manner. If the control valve is in the open position, hydraulic medium flows from the second connecting line through the boreholes of the housing and the hollow cylinder into the hollow cylinder of the piston and subsequently into the first connecting line. If the pressure in the first connecting line exceeds a given value, the piston is moved slightly in the closing direction, which leads to the boreholes of the housing and the piston only being in communication in a partial region. This has the result that due to the restricting effect of the passage between the two boreholes the hydraulic medium now flows more slowly into the hollow cylinder and thus into the first connecting line. If the pressure in the first connecting line continues to increase, the piston of the control valve is moved further into the closed position, which finally leads to the boreholes of the piston and the housing no longer being in communication with each other so that a separation of the first and second connecting lines is achieved.

If, in contrast, the pressure increases in the first control line, which is the case when the control valve is closed during the pressure build-up, the piston is moved partially in the open direction, which leads to the boreholes in the housing and in the piston being at least partially in communication and at full opening fully in communication with each other. The control valve is fully opened in this state.

The invention further relates to a multi-disc clutch, having a disc package which can be compressed by a piston having a feed for hydraulic medium and being disposed such that when the feed is subjected to pressure, a force directed to the disk package can be generated on the piston and having one or more restoring elements which apply a counter-force acting upon the piston against the force which can be applied by the hydraulic medium which possesses a starting control in accordance with the invention, with the feed of the multi-disc clutch being in communication with the first connecting line of the starting control.

It is particularly advantageous if the restoring elements of the multi-disc clutch are designed as springs.

The present invention further relates to a vehicle, particularly a commercial vehicle, in which a starting control in accordance with the invention is provided by means of which the piston/cylinder unit of the vehicle can be controlled.

In another aspect of the present invention it is provided that the piston/cylinder unit of the vehicle is a component of a multi-disk clutch.

BRIEF DESCRIPTION OF THE DRAWINGS

Further details and advantages of the present invention are described in more detail below by means of an embodiment shown in the drawing, in which.

DESCRIPTION OF THE PREFERRED EMBODIMENTS

Figure 1:
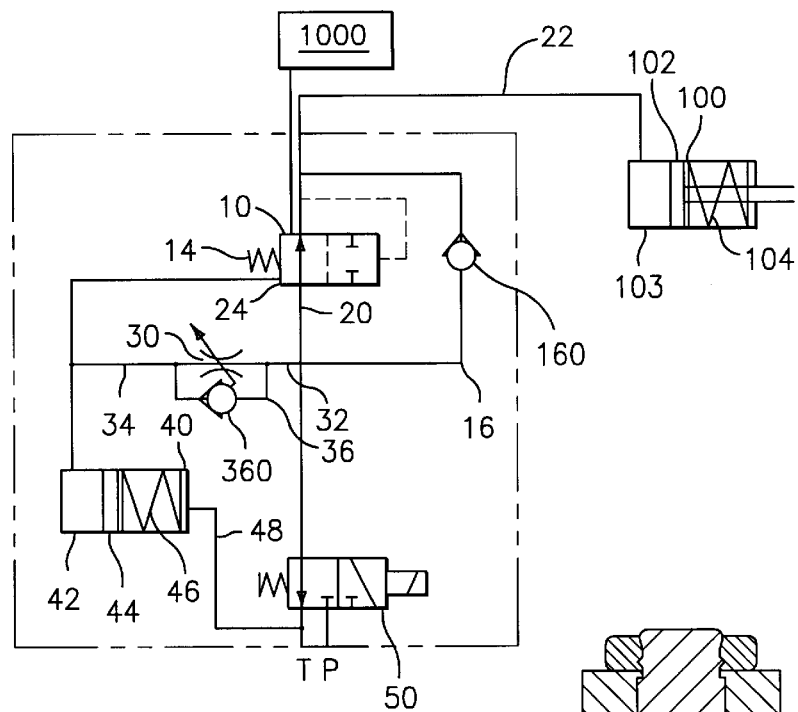
FIG. 1 shows a schematic representation of the starting control in accordance with the invention.

FIG. 1 shows in a schematic representation the configuration of the starting control in accordance with the invention. Between the pressure feed P and the piston/cylinder unit 100, the control valve 10 is provided which is subjected to the spring 14. The spring 14 has the effect that the control valve 10 is in the open position in the state not subject ed to hydraulic medium.

The control valve 10 is in communication with the second connecting line 20 which can be connected to the pressure feed P and with the first connecting line 22 which can be connected to the clutch 100. Furthermore, a first control line 24 is provided which is designed in accordance with the invention in such a way that when pressure is applied to the control valve 10 a force acting in the open position can be generated. The connecting line 22 effects a force directed to the closed position of the control valve 10 when pressure is applied. The broken line between the first connecting line 22 and the control valve 10 characterizes the effect of the pressure existing in the line 22 on the control valve 10. The pressure force prevailing in the first control line 24 as also the spring 14 act in the open position of the control valve 10.

The starting control in accordance with the invention further possesses the restrictor element 30, whose inlet 32 can be connected to the pressure feed P and whose outlet 34 is in communication with a pressure store 40 and the first control line 24.

The pressure store 40 is designed as a piston/cylinder unit which possesses the piston chamber 42, the piston 44 and the spring 46, with the spring 46 acting against the pressure force prevailing in the piston chamber 42 on the piston 44. The piston/cylinder unit is connected to the outlet line 48, by means of which hydraulic medium passing the piston 44 can be led back into the storage tank T of the starting control.

To separate the starting control from the pressure feed P, the solenoid valve 50 is provided which is opened on a corresponding actuation of the clutch. Instead of a solenoid valve 50, any other valve or control organ can be used.

By-pass lines 16, 36 are provided both around the control valve 10 and around the restrictor element 30 by means of which, when the clutch is disengaged, the hydraulic medium can be drained off both from the piston/cylinder unit 100 and from the pressure store 40 back into the storage tank T. Both by-pass lines 16, 36 possess check valves 160, 360 which are only permeable with a corresponding return of the medium, while they remain closed during the pressure build-up.

FIG. 1 further shows in a schematic representation the piston/cylinder unit 100, whose piston 102 serves to apply a pressure force, for example, to the disc package of a multi-disc clutch. The clamping pressure is generated by the hydraulic medium led correspondingly through the starting control, which hydraulic medium flows into the piston chamber 103 of the piston/cylinder unit 100 and exerts a corresponding pressure force on the piston 102. The piston 102 is subjected to the spring 104 which, when used in a multi-disc clutch in the non-actuated state of the clutch, effects the release of the disc package and so the disengaged state.

The function of the starting control in accordance with the invention is illustrated by means of FIGS. 2 to 5, with the same symbols being used for identical components.

Figure 2:
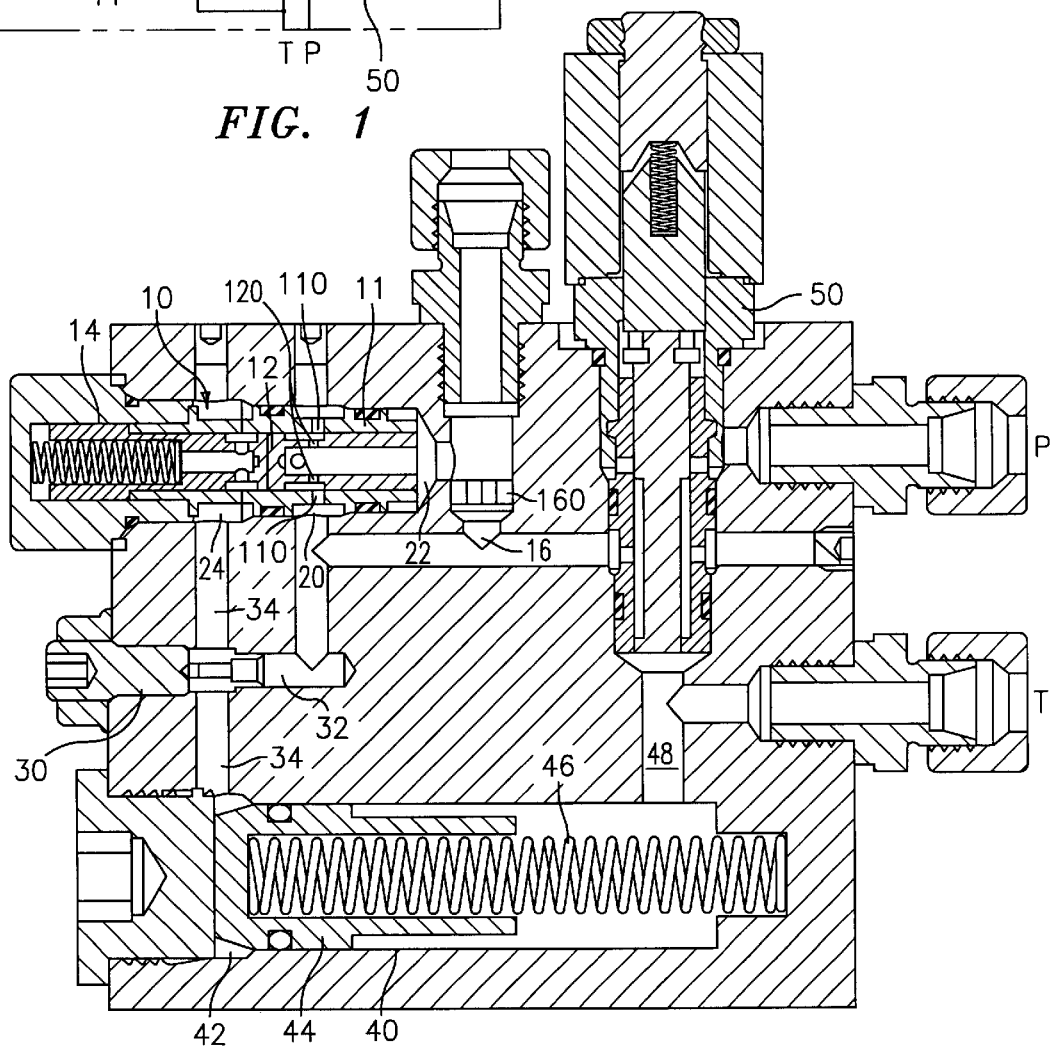
FIG. 2 shows a sectional representation of the starting control in accordance with the invention without any hydraulic medium.

FIG. 2 shows in a sectional representation the components of the starting control already explained with respect to FIG. 1. The solenoid valve 50 is located in the region next to the pressure feed P. Furthermore, the control valve 10 can be seen which comprises the piston 12 accepted movably in the housing 11 and the spring 14. The spring 14 exerts a force directed to the right in accordance with FIG. 2 on the piston 12, whereby the control valve 10 is maintained in the open position in the state not subjected to hydraulic medium. Below the piston 12 is located the second connecting line 20. The piston 12 is in communication on the front side with the first connecting line 22.

The housing 11 of the control valve 10 possesses boreholes 10 in communication with the second connecting line 20. The piston 12 of the control valve 10 is designed as a hollow cylinder in its end region shown at the right and possesses in the wall of the hollow cylinder boreholes 120 too which communicate in the open position of the control valve shown in FIG. 2 with the boreholes 110 of the housing 1, whereby also the connection of the first connecting line 22 with the second connecting line 20 is generated.

The control valve 10 is further in communication with the first control line 24 which is disposed in such a way that at its being subjected to pressure a force acting to the right in FIG. 2 is exerted on the piston 12.

If the control valve 10 is open, the hydraulic medium flows through the hollow cylinder of the piston 12 into the first connecting line 22. The medium existing in the first connecting line 22 exerts a pressure force on the piston to the left and so in the closing direction.

Between the first connecting line 22 and the second connecting line 20 is located the by-pass line 16 in which the check valve 160 is disposed.

In the region below the control valve 10 is located the restrictor element 30 which is in communication with the inlet 32 which can be connected to the pressure feed P. The outlet 34 of the restrictor element 30 is in communication with the first control line 24 and with the pressure feed 40.

Figure 3:
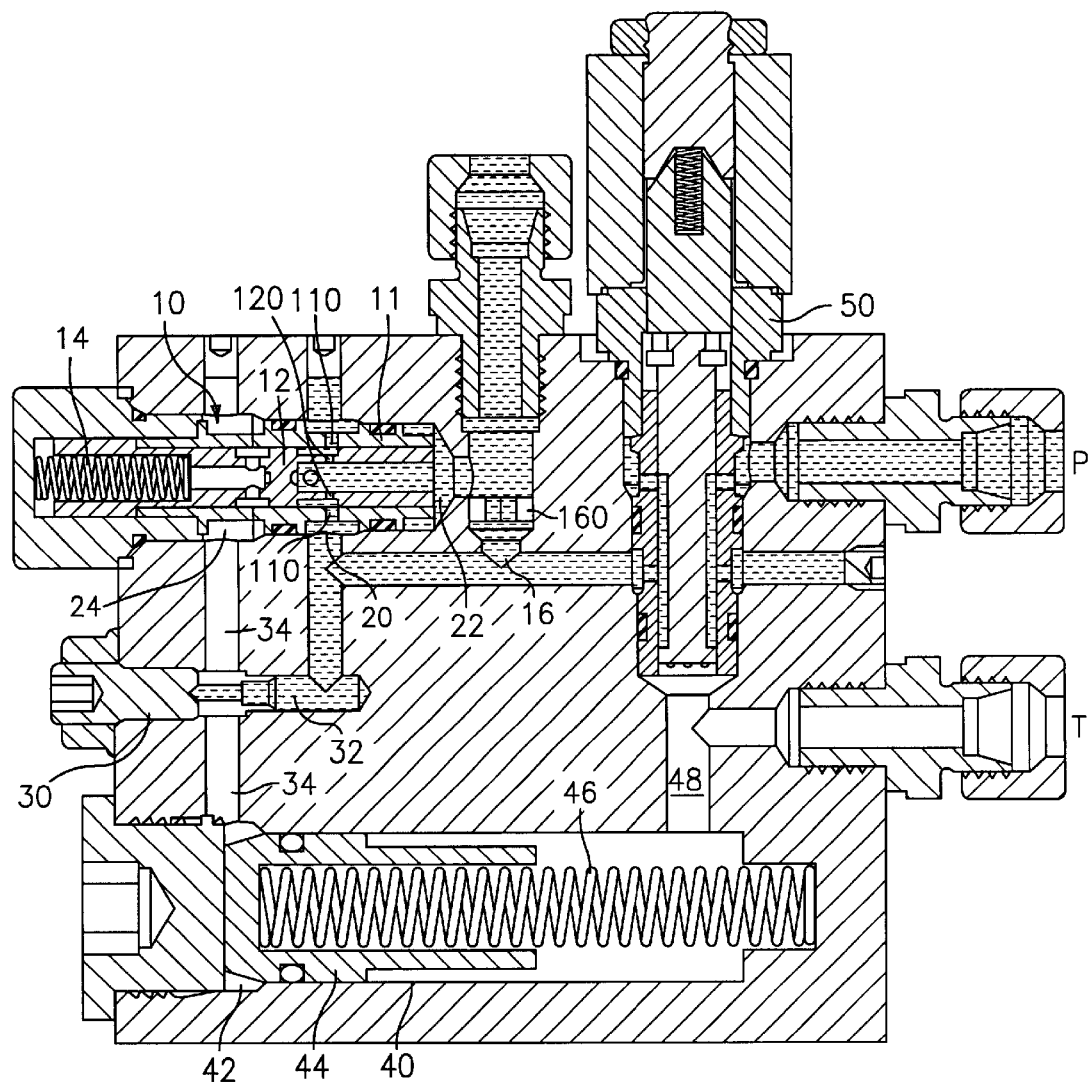
FIG. 3 shows the starting control of FIG. 2 during the filling of the piston chamber of the multi-disc clutch.

FIG. 3 shows the starting control of FIG. 2 during the filling of the piston chamber 103 of the piston/cylinder unit 100 or of a multi-disc clutch. The hydraulic medium enters from the pressure feed P through the opened solenoid valve 50 first through the second connecting line 20 of the control valve 10 and through the cavity of the piston 12 into the first connecting line 22 and is here led through a corresponding connecting piece into the piston chamber 103 of the piston/cylinder unit 100. The hydraulic medium is in this state also in the inlet 32 of the restrictor element 30, but there is no or only a slight flow through the restrictor element 30.

During the state shown in FIG. 3, the piston chamber 103 of the piston/cylinder unit 100 or of a multi-disc clutch is filled until the piston 102 abuts the desired position or the disc package.

Figure 4:
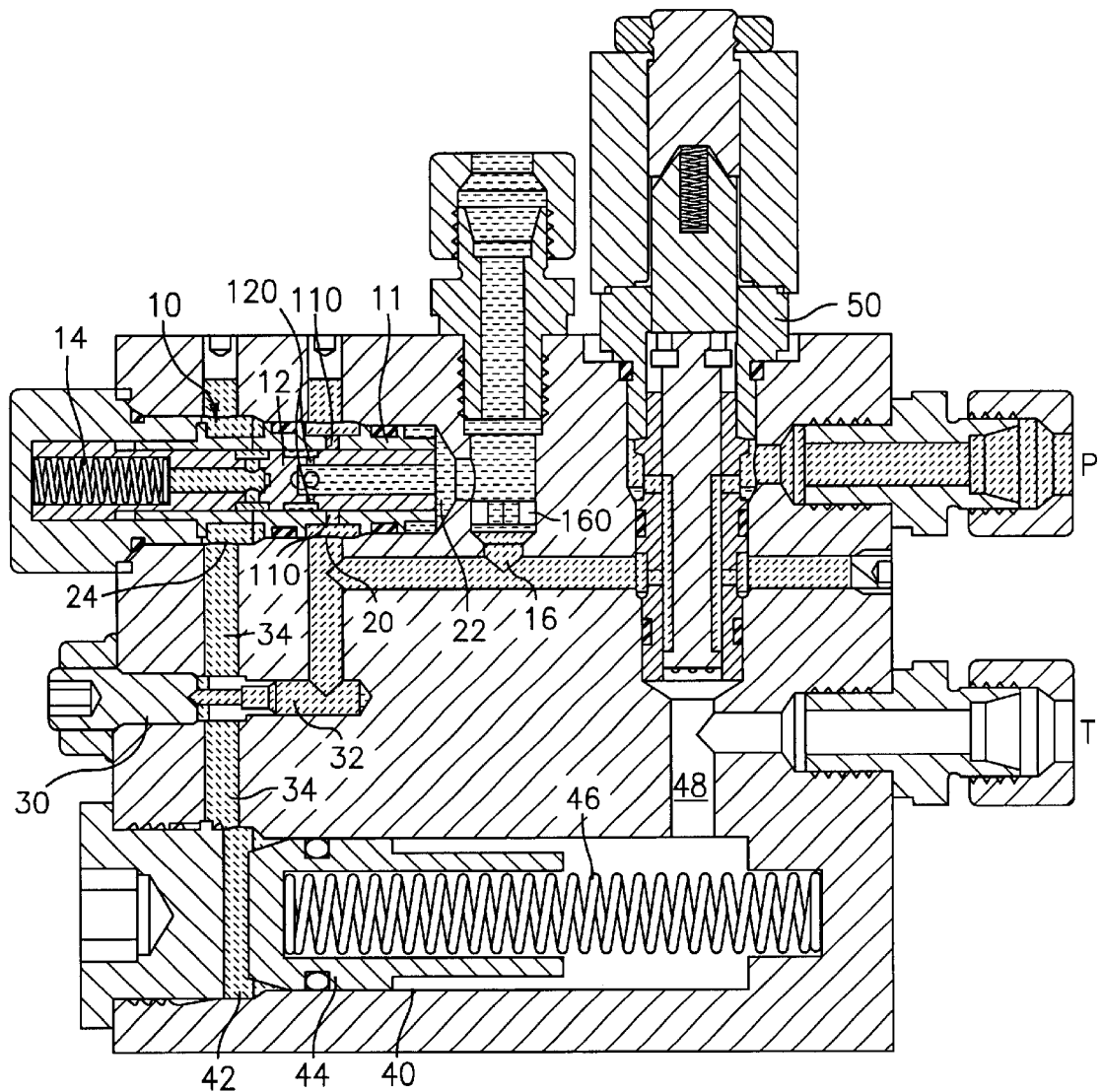
FIG. 4 shows the starting control of FIG. 2 on completion of the filling of the piston chamber and at the beginning of the pressure build-up.
Figure 5:
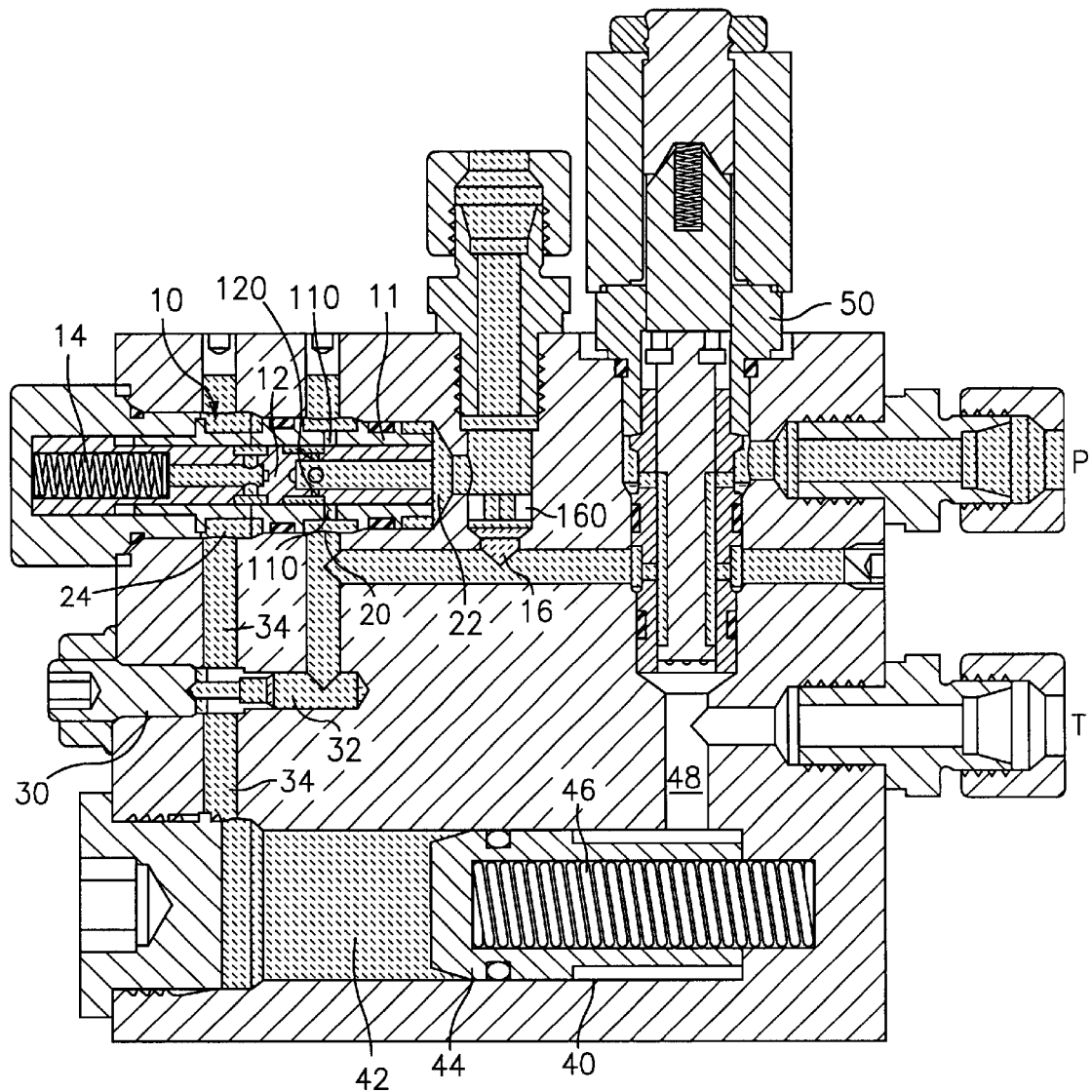
FIG. 5 shows the starting control of FIG. 2 after completion of the pressure build-up.

When the filling of the piston chamber 103 is ended, which is, for example, the case at a pressure of 1.5 bar in the first connecting line 22, the pressure build-up shown in FIG. 4 begins. If the piston 102 of the piston/cylinder unit or the multi-disc clutch is in the desired position, a pressure increase occurs in the first connecting line 22. The pressure increase has the effect that a force directed to the left is exerted on the piston 12 of the control valve 10. If this exceeds the spring force of the spring 14, the piston is moved to the left as in FIG. 4, which leads to the piston of the control valve 10 being moved into the closed position.

This movement of the piston 12 of the control valve 10 has the effect that the boreholes 110 of the housing 11 are no longer in communication with the boreholes 120 of the piston 12, but transposed with respect thereto in such a way that the first connecting line 22 is separated from the second connecting line 20 in a fluid-tight manner.

In the closed position of the control valve 10, the hydraulic medium now flows through the restrictor element 30, on the one band into the first control line 24 and, on the other hand, into the piston chamber 42 of the piston/cylinder unit of the pressure store 40. As can be seen from FIG. 4, in this way the piston 44 is moved against the spring force 46.

The flow of hydraulic medium into the first control line here effects a corresponding pressure increase, which leads to the pressure force generated thereby exceeding together with the force of the spring 14 the pressure force in the first connecting line 22 acting on the piston 12. If this is the case, the control valve 10 opens slightly. The boreholes 110, 120 of the housing 11 or of the piston 12 are in communication with each other. Depending on the prevailing pressure difference, the boreholes 110, 120 overlap partially or completely. With partial overlapping, there is only a correspondingly restricted flow of hydraulic medium from the second connecting line 20 through the cavity of the piston 12 into the first connecting line 22. Due to the flow of hydraulic medium, the pressure increases in the first connecting line 22 and in the piston chamber 103 of the piston/cylinder unit 100 or in the piston chamber of the multi-disc clutch. Due to the resulting increase in the pressure force acting in the closing position of the control valve 10, this is again close.

This interaction of opened and closed states of the control valve 10 leads to the piston chamber 103 of the piston/cylinder unit 100 being subjected to pressure at a given speed, whereby accordingly the desired time slope of the clamping pressure of the piston 102 is realized, for example, at the disc package. The pressure in the piston chamber 42 of the piston/cylinder unit of the pressure store 40 increases at the same speed.

If the pressure build-up has ended, the piston 102 abuts the disc package with the desired clamping pressure. The pressure of the pressure feed P of, for example, 18 bar is now applied to the piston 102. A further flow of hydraulic medium for the purpose of pressure build-up is not effected. Losses of hydraulic medium in the piston/cylinder unit 100 or in the disc clutch can be compensated by a correspondingly partial opening of the control valve 10. The pressure drop in the first connecting line 22 generated by losses effects a partial opening of the control valve 10, which is realized by the openings 110 and 120 being at least partially in communication with one another. This state which is produced with the clutch engaged can be seen in FIG. 5.

After the clutch is disengaged, the hydraulic medium enters back into the storage tank T from the piston chamber 103 of the piston/cylinder unit 100 and from the piston chamber 42 of the pressure store 40 and is there available for a further engagement of the clutch.

Figure 6:
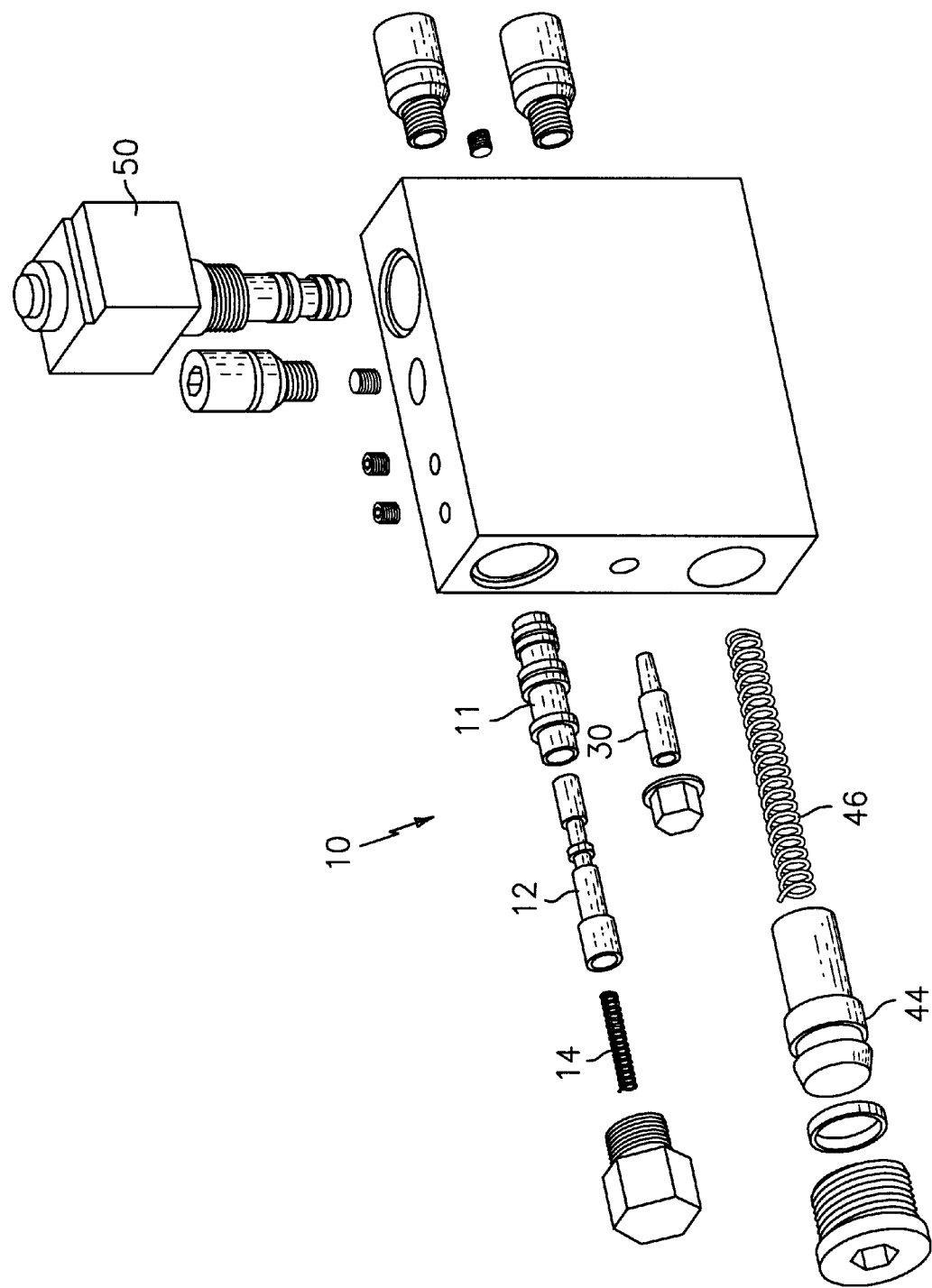
FIG. 6 shows a perspective view of the starting control in accordance with the invention in an exploded representation.

In FIG. 6, the disposition of the elements of the starting control in accordance with the invention is visible in a perspective representation. In this, the solenoid valve 50 and the control valve 10 with housing 11, piston, 12 and spring 14 are visible. In the region below the control valve 10 the restrictor element 30 is located. In the lower region of the starting control, the piston 44 of the pressure store 40 which can be subjected to the spring 46 can be seen. In the region next to the solenoid valve 50 and in the region to the right of the housing of the starting control, connecting pieces can be seen which serve the connection of the starting control to a piston/cylinder unit or multi-disc clutch and to the pressure feed and a tank accepting the hydraulic medium.

Figure 7:
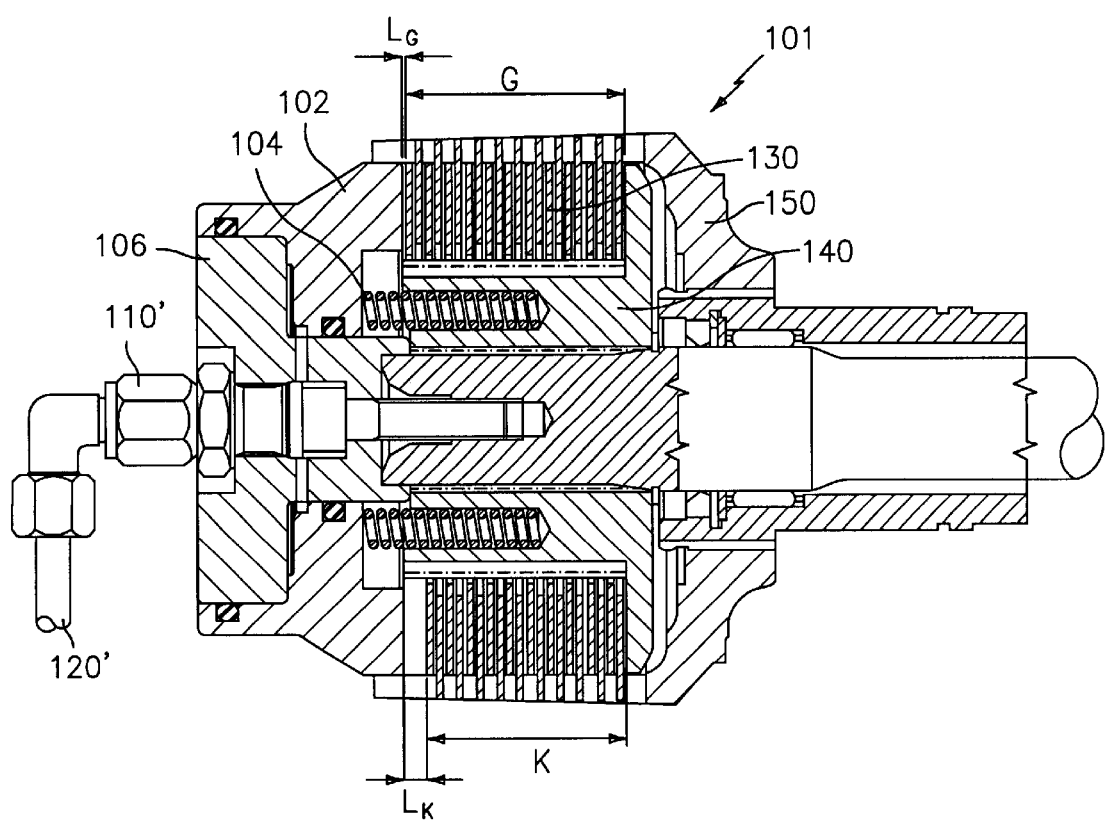
FIG. 7 shows a longitudinal sectional representation through a multi-disc clutch.

FIG. 7 shows the design of the multi-disc clutch 101 in a longitudinal section representation. The disc package 130 connects the inside hub 140 with the outside drum 150 in the engaged state and thus, for example, a transmission shaft with a shaft driven by an engine. The engaged state is achieved by the piston 102 being moved to the right against the force of the restoring springs 104 in FIG. 7 and so compressing the disc package 130 in a non-positive manner.

The piston 102 is disposed on the piston carrier 106. This further possesses the twist-screw connection 110' on which the oil feed 120 is disposed.

The disc package 130 can vary in its length in dependence on production tolerances or due to wear between a minimum dimension K and a maximum dimension G, which leads to the release path varying between the lengths $L_G$ and $L_K$.

By means of the starting control in accordance with the invention it is achieved that the time slope of the clamping pressure of the piston 102 on the disc package 130 remains constant irrespective of the length of the release path, which always ensures a soft engagement of the clutch irrespective of production tolerances or wear.

What is claimed is:

1. A starting control for the control of a hydraulic piston/cylinder unit (100), in particular for the control of a multi-disc clutch (101), having
   a control valve (10) which is movable into an open and a closed position;
   a first connecting line (22) which can be connected to the hydraulic piston/cylinder unit (100) and a second connecting line (20) which can be connected to a pressure feed (P);
      with the first (22) and the second (20) connecting line being in communication with the control valve (10), and with the first connecting line (22) being designed in such a way that when it is subjected to pressure, a force acting in the closed position can be generated on the control valve (10);
   a first control line (24) which is in communication with the control valve (10) in such a way that when it is subjected to pressure a force acting in the open position can be generated on the control valve (10), and having
   a restrictor element (30) whose inlet (32) is structured and arranged to be connected to the pressure feed (P) and whose outlet (34) is in communication with a pressure store (40) in one direction and with the first control line (24) and, in another direction
   with the control valve (10) being structured and arranged such that it is moved from the open position into the closed position when the pressure force acting in the first connecting line (22) exceeds the pressure force acting in the first control line (24) by a given amount.

2. A starting control in accordance with claim 1, wherein a second control line is provided which is in communication with the first connecting line (22) and with the control valve (10) and which is designed in such a way that when the second control line is subjected to pressure, a force acting in the closed position can be generated on the control valve (10).

3. A starting control in accordance with claim 1, wherein a spring (14) is provided which biases the control valve (10) in the open position.

4. A starting control in accordance with claim 1, wherein an electrical measurement and control unit is provided by means of which the pressures
   in the first control line (24), and
   in the first connecting line (22) and/or in the second control line
can be detected and assessed and by means of which a force acting in the open or closed position of the control valve (10) can be exerted in dependence on the assessment.

5. A starting control in accordance with claim 1, wherein a solenoid valve (50) is provided by means of which the starting control can be locked from the pressure feed (P).

6. A starting control in accordance with claim 1, wherein the restrictor element (30) and/or the control valve (10) possess a by-pass line (36, 16) in which a check valve (160, 360) is provided by means of which its hydraulic medium can be led from the pressure store (40) and/or from the piston/cylinder unit (100).

7. A starting control in accordance with claim 1, wherein the pressure store (40) comprises a piston/cylinder unit whose piston chamber (42) is in communication with the outlet (34) of the restrictor element (30) and whose piston (44) is subject to a spring (46) against the pressure force prevailing in the piston chamber (42).

8. A starting control in accordance with claim 7, wherein the piston/cylinder unit of the pressure store (40) possesses an outlet line (48) by means of which the hydraulic medium passing through the piston (42) can be led off.

9. A starting control in accordance with claim 1, wherein the pressure drop which can be generated in the throughflow of the restrictor element (30) can be adjusted.

10. A starting control in accordance with claim 1, wherein the control valve (10) possesses a housing (11) and a piston (12) movably accepted therein which is biased in the open position of the control valve (10) and which is in communication with the first control line (24) and the first connecting line (22) and by means of which the control valve (10) can be opened or closed in dependence on the piston position.

11. A starting control in accordance with claim 10, wherein the housing (11) possesses boreholes (110) being in communication with the second connecting line (20), the piston (12) is designed as a hollow cylinder in the end region being in communication with the first connecting line (22), with the wall of the hollow cylinder possessing boreholes (120) which in the open position of the control valve (10) are in communication with the boreholes (110) of the housing (11) and being separated therefrom in a fluid-tight manner in the closed position of the control valve (10).

12. A multi-disc clutch (101) having a disc package (130) which can be compressed by a piston (102), having a feed (120) for a hydraulic medium, being disposed in such a way that when the feed (120) is subjected to pressure a force directed to the disc package (130) can be generated on the piston (102) and having one or more restoring elements which apply a counter force acting on the piston against the force which can be applied by the hydraulic medium, wherein the multi-disc clutch (101) possesses a starting control in accordance with claim 1, with the feed (120) of the multi-disc clutch (101) being in communication with the first connecting line (22) of the starting control.

13. A multi-disc clutch (101) in accordance with claim 12, wherein the restoring elements are designed as springs (104).

14. A vehicle, in particular a commercial vehicle, having a piston/cylinder unit (100) which can be subjected to a hydraulic medium,
wherein a starting control in accordance with claim 1 is provided by means of which the piston/cylinder unit (100) can be controlled.

15. A vehicle in accordance with claim 14, wherein the piston/cylinder unit (100) is a component of a multi-disc clutch (101).

16. A start control in accordance with claim 1 wherein the restrictor element (30) is positioned between the pressure store (40) and first control line (24) such that a first outlet (34) communicates with the pressure store (40) and a second outlet (34) with the control line (24) upstream of the control valve (10).

17. A start control valve in accordance with claim 16 wherein said restrictor element (30) is positioned such that, in closed position of the control valve (10), hydraulic medium flows through the restrictor element (30) in one direction into the first control line (24) and in another direction into the pressure store (40).

18. A start control in accordance with claim 17, structured and arranged such that interaction of opened and closed states of the control valve (10) leads to a piston chamber (103) of the piston/cylinder unit (100) being subjected to pressure at a given speed, whereby desired time slope of clamping pressure of a piston (102) in the piston chamber (103) is attained, and pressure in a piston chamber (42) of the pressure store (40) increases at the same rate.

19. A start control valve in accordance with claim 1 wherein said restrictor element (30) is positioned such that, in closed position of the control valve (10), hydraulic medium flows through the restrictor element (30) in one direction into the first control line (24) and in another direction into the pressure store (40).

20. A start control in accordance with claim 1, structured and arranged such that interaction of opened and closed states of the control valve (10) leads to a piston chamber (103) of the piston/cylinder unit (100) being subjected to pressure at a given speed, whereby desired time slope of clamping pressure of a piston (102) in the piston chamber (103) is attained, and pressure in a piston chamber (42) of the pressure store (40) increases at the same rate.

* * * * *